UNITED STATES PATENT OFFICE.

EMIL FISCHER, OF BERLIN, GERMANY, ASSIGNOR TO FARBENFABRIKEN VORM. FRIEDR. BAYER & CO., OF ELBERFELD, GERMANY, A CORPORATION OF GERMANY.

CALCIUM SALT OF DIBROMBEHENIC ACID.

No. 917,758.  Specification of Letters Patent.  Patented April 13, 1909.

Application filed August 12, 1908. Serial No. 448,239. (Specimens.)

*To all whom it may concern:*

Be it known that I, EMIL FISCHER, professor of chemistry, citizen of the German Empire, residing at Berlin, Kingdom of Prussia, Germany, have invented new and useful Improvements in a Calcium Salt of Dibrombehenic Acid, of which the following is a specification.

I have found that the dibrombehenic acid gives a solid, stable, tasteless and odorless calcium salt which is a valuable substitute for potassium bromid, an average dose being from 1 to 2 grams.

My new preparation is obtained by converting the free dibrombehenic acid or its alkaline salts into the calcium salt.

The dibrombehenic acid is prepared by treating erucic acid with bromin.

The preparation of the calcium salt of dibrombehenic acid is carried out as follows, the parts being by weight:

Example 1: 30 parts of crystallized chlorid of calcium containing water of crystallization are dissolved in 150 parts of hot alcohol and an excess of gaseous ammonia is passed through the liquid. When the precipitation of ammonium chlorid has been completed, 130 parts of alcohol (92%) are added. It is then cooled to ordinary temperature. To the cold mixture a solution of 45 parts of dibrombehenic acid in 200 parts of alcohol is slowly added during stirring. The calcium salt of dibrombehenic acid separates out in the shape of a white voluminous precipitate. It is filtered off with suction, pressed, washed with alcohol, mixed up by stirring with cold water, filtered off with suction and subsequently washed with water until the wash-water is free from chlorin. It is then washed with alcohol and dried *in vacuo*. The calcium salt thus obtained is a white, tasteless and odorless powder almost insoluble in water and alcohol. It has the formula:

$$(C_{22}H_{41}Br_2O_2)_2Ca.$$

Example 2: The same salt results by the interaction of an alkaline salt of dibrombehenic acid with calcium salts in aqueous solution. For this purpose dibrombehenic acid is dissolved in caustic potash by shaking it at ordinary temperature with highly diluted caustic potash (about 1/40 normal). The calculated quantity of a dilute aqueous solution of chlorid of calcium is added to the solution, and it is stirred until the colorless flocculent precipitate has settled. It is treated as described in Example 1.

Example 3: 1 part of molten dibrombehenic acid is shaken at ordinary temperature and for several days with 100 parts of a saturated aqueous solution of calcium hydroxid. The resulting calcium salt, which still contains small amounts of the free acid, is filtered off and is then heated with alcohol to dissolve the free acid and carefully mixed up with the liquid by stirring. After cooling the salt forms a white powder which is filtered off, washed with alcohol, and dried *in vacuo*.

The yield of the above process is very good, being above 90% of the calculated theoretical figures.

Having now described my invention and in what manner the same is to be performed, what I claim as new and desire to secure by Letters Patent is:—

The herein-described calcium salt of dibrombehenic acid of the following formula $$(C_{22}H_{41}O_2Br_2)_2Ca$$

obtainable by treating dibrombehenic acid with chlorid of calcium, which calcium salt is a white solid body, tasteless, odorless and almost insoluble in water, insoluble in alcohol but soluble in ether and chloroform and which is a valuable substitute for potassium bromid, substantially as hereinbefore described.

In testimony whereof I have hereunto set my hand in the presence of two subscribing witnesses.

EMIL FISCHER.

Witnesses:
HENRY HASPER,
ARTHUR SCHROEDER.